United States Patent
Kreutzer et al.

(10) Patent No.: US 10,657,282 B2
(45) Date of Patent: *May 19, 2020

(54) ACCESS CONTROLLED GRAPH QUERY SPANNING

(71) Applicant: Microsoft Technology Licensing, LLC, Redmond, WA (US)

(72) Inventors: Tor Kreutzer, Tromsø (NO); Steffen Viken Valvag, Tromsø (NO); Dag Steinnes Eidesen, Tromsø (NO); Amund Kronen Johansen, Tromsø (NO); Peter Dahle Heen, Tromsø (NO); Jan-Ove Almli Karlberg, Tromsø (NO); Jon Meling, Tromsø (NO); Age Kvalnes, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,783

(22) Filed: Feb. 6, 2019

(65) Prior Publication Data

US 2019/0171840 A1  Jun. 6, 2019

Related U.S. Application Data

(63) Continuation of application No. 15/444,314, filed on Feb. 27, 2017, now Pat. No. 10,242,223.

(51) Int. Cl.
*H04L 29/06* (2006.01)
*G06F 21/62* (2013.01)
(Continued)

(52) U.S. Cl.
CPC ...... *G06F 21/6227* (2013.01); *G06F 16/9024* (2019.01); *G06F 16/9535* (2019.01);
(Continued)

(58) Field of Classification Search
CPC ............. G06F 21/6227; G06F 16/9535; G06F 16/9024; G06F 21/62; G06F 21/6209; H04L 63/10; H04L 63/101
(Continued)

(56) References Cited

U.S. PATENT DOCUMENTS

2013/0232452 A1 9/2013 Krajec et al.
2013/0246454 A1* 9/2013 Menten ............. G06Q 10/1093
707/769
(Continued)

OTHER PUBLICATIONS

"Non Final Office Action Issued in U.S. Appl. No. 15/338,290", dated May 30, 2019, 13 Pages.
(Continued)

*Primary Examiner* — Michael S McNally (57) ABSTRACT

Controlling access to nodes in a relational graph at query time by using an approximate membership query (AMQ) filter and ordered queries based on historic grants or denials of access according to security context enables a more efficient querying of the relational graph while preserving access controls. Security contexts that grant or deny access to a node are stored in an associated AMQ filter and are queried according to the subject's security context in an order based on the frequency at which the security contexts have previously granted or denied access to nodes in the relational graph.

20 Claims, 5 Drawing Sheets

(51) Int. Cl.
  *G06F 16/901* (2019.01)
  *G06F 16/9535* (2019.01)

(52) U.S. Cl.
  CPC .......... *G06F 21/62* (2013.01); *G06F 21/6209* (2013.01); *H04L 63/10* (2013.01); *H04L 63/101* (2013.01)

(58) Field of Classification Search
  USPC .......................................................... 726/27
  See application file for complete search history.

(56) References Cited

U.S. PATENT DOCUMENTS

| | | |
|---|---|---|
| 2014/0164347 A1 | 6/2014 | Jeh et al. |
| 2014/0278590 A1 | 9/2014 | Abbassi et al. |
| 2014/0330818 A1 | 11/2014 | Raina et al. |
| 2015/0106324 A1 | 4/2015 | Puri et al. |
| 2015/0234936 A1 | 8/2015 | Hu et al. |
| 2015/0242402 A1 | 8/2015 | Holm et al. |
| 2015/0248487 A1 | 9/2015 | Baranowski et al. |
| 2015/0363461 A1 | 12/2015 | Behal et al. |
| 2016/0148093 A1 | 5/2016 | Adderly et al. |
| 2017/0206276 A1 | 7/2017 | Gill |
| 2017/0364539 A1 | 12/2017 | Jacob et al. |

OTHER PUBLICATIONS

"Final Office Action Issued in U.S. Appl. No. 15/282,718", dated Mar. 11, 2019, 13 Pages.

"Notice of Allowance Issued in U.S. Appl. No. 15/399,975", dated Apr. 17, 2019, 12 Pages.

"Notice of Allowance Issued in U.S. Appl. No. 15/399,989", dated Jun. 12, 2019, 12 Pages.

* cited by examiner

ACCESS CONTROLLED GRAPH QUERY SPANNING

CROSS-REFERENCE TO RELATED APPLICATIONS

This application is a continuation application of U.S. patent application Ser. No. 15/444,314, entitled "ACCESS CONTROLLED GRAPH QUERY SPANNING," filed on Feb. 27, 2017, the entire disclosure of which is hereby incorporated herein by reference.

BACKGROUND

In a graph database, entities are presented as nodes and relationships between those entities are presented as edges in a view of the relational graph maintained by the graph database. The relational graph may be periodically queried by users via graph queries to learn about the relationships between entities and to discover related entities. For example, a user may issue a graph query to find friends or contacts within a social network, the documents that a given user has interacted with, the users that a given document has been accessed by, the entities that satisfy various search criteria, etc. The graph query produces a subgraph of the queried relational graph that satisfies the query, which may be further analyzed by the user. Graph queries, however, may span graph entities that the querying user lack permission to access as nodes, or as properties/relationships thereof. Even if these entities are scrubbed from the results, the fact that other entities were discovered via the non-permitted or forbidden graph entities can expose information to the querying user, and requires the expenditure of additional computing resources.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable storage devices embodying instructions for providing access controlled graph queries are disclosed herein. The access controls of an entity modeled as a node in a graph database are observed by graph queries to the graph database at query time by querying Approximate Member Query (AMQ) filters and lists associated with each spanned node that store the security contexts of the associated object.

A filter query (i.e., a query to the AMQ filters) returns a probabilistic response as to whether a given security context is included as a member in the AMQ filter. A given AMQ filter includes as members the security contexts that are allowed to access the associated object or are forbidden to access the associated object. Querying parties test their security contexts against the AMQ filter at query runtime to determine whether to span access controlled nodes in the graph. When the querying party is associated with the correct security contexts, indicated by the AMQ filters and lists, the graph query will span the node and attempt to connect to adjacent nodes. Otherwise, the node will be excluded from the span and the graph query continues to span other nodes.

Filter queries improve the computational efficiency of determining whether a given node may be accessed by a given graph query, especially when a greater numbers of security context are deployed. Additionally, security contexts that are more frequently used to grant or deny access may be prioritized when querying the AMQ filters and lists to further improve computational efficiency.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Figure 1:
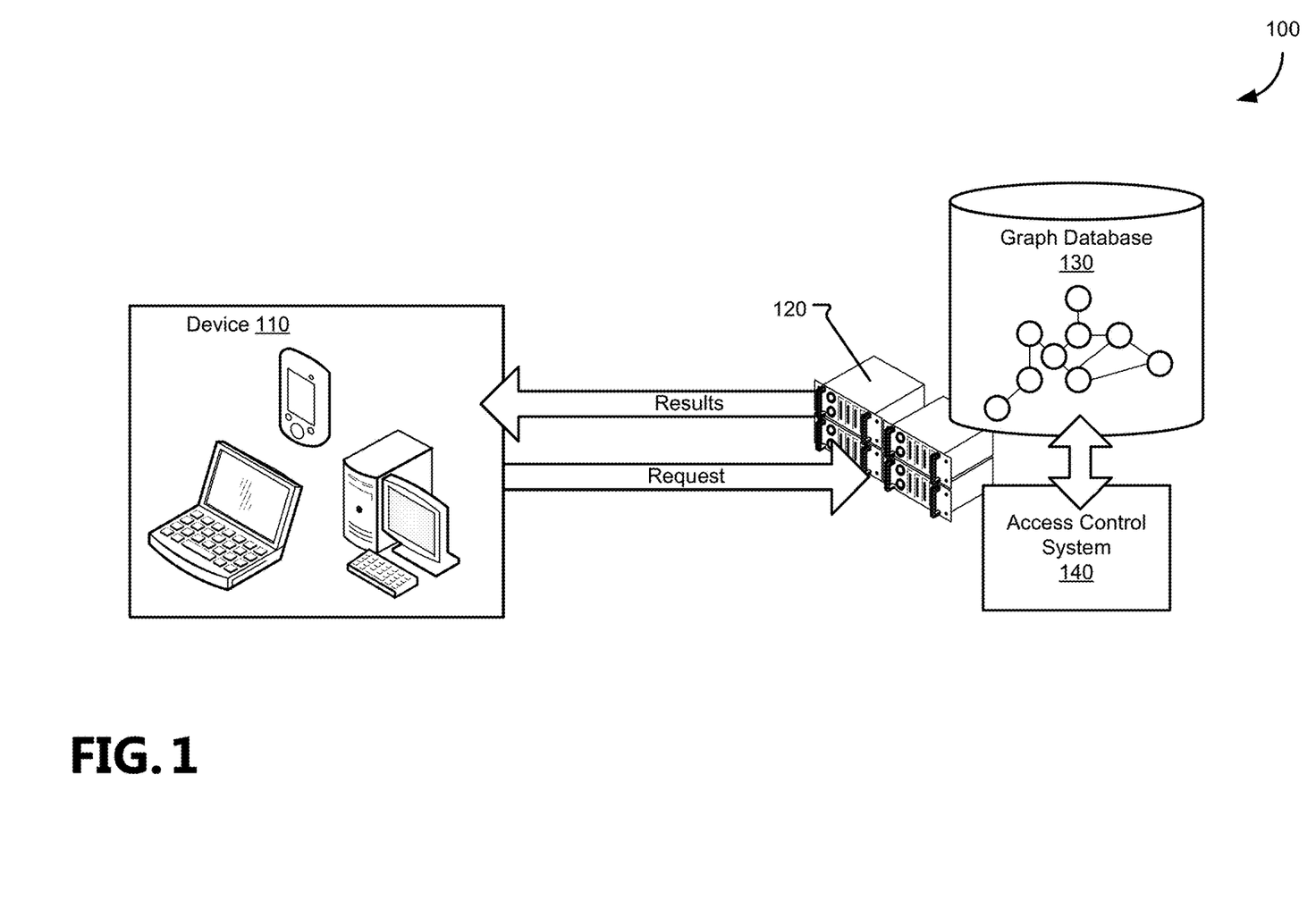
FIG. 1 illustrates an example operating environment in which the present disclosure may be practiced.

FIG. 1 illustrates an example operating environment 100 in which the present disclosure may be practiced. A user device 110 is in communication with a graph server 120, which maintains a relational graph in a graph database 130. A relational graph maintains several entities as nodes and the relationships between those nodes as edges connecting related nodes, and the graph database 130 is operable to store one or more relational graphs and subgraphs thereof for the user device 110 to query and perform analytics thereon. An access control system 140 maintains security contexts for various groups and the members thereof to grant or prevent access to the entities in the systems on which the relational graph is based. These security contexts, and their usage statistics, are provided to the graph database 130 by the access control system 140 to provide the access controlled graph spanning of the present disclosure.

Each of the user device 110 and graph server 120 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, printers, and mainframe computers. The hardware of these computing systems is discussed in greater detail in regard to FIGS. 4 and 5. User devices 110 are operated by users, who may be humans or automated systems (e.g., "bots"). In various aspects, the user device 110, and graph server 120 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The graph server 120 hosts a graph database 130 of a relational graph with nodes describing entities and a set of accompanying properties of those entities, such as, for example, the names, titles, ages, addresses, etc. Each property can be considered a key/value pair—a name of the properties and its value. In other examples, entities represented as nodes that include documents, meetings, communication, etc., as well as edges representing relations among these entities, such as an edge between a person node and a document node representing that person's authorship, modification, or view of the document. In some aspects, security nodes (representing security contexts) are maintained in the relational graph so that entities having or requiring a given security context are related via an edge to one or more security nodes. In other aspects, when an entity has or requires a given security context, that security context is maintained as a property in the node for that entity.

The graph server 120 executes graph queries that are submitted by various users, referred to herein as "subjects". The graph server 120 is also operable to access the graph structure description, which resides in the graph database 130, which may include, in various aspects: a relational database, a NoSQL database, or any other database.

When accessing the graph database, various security contexts for the subject are determined at query time to allow or deny the spanning of nodes within the relational graph. The security contexts include personal security contexts, related to the various security groups that the subject user belongs to, which may be maintained in a directory server and associated in the relational graph by edges from the node representing the subject to one or more security nodes that indicate the personal security context afforded to the subject.

Machine and access point security contexts may be used in addition to or instead of personal security contexts to affect the subject's access rights. A given machine is specified as permitted/forbidden to access certain nodes via machine security contexts, for example, to forbid an unknown or new device from spanning certain nodes (despite the user being otherwise allowed) for data security purposes. Similarly, a user and/or machine may be permitted to span a given node while at an office location, but not while mobile via access point security contexts. Access point security contexts specify various locations, networks, or network settings (e.g., forbidding certain wireless communications standards) that are allowed or forbidden to span certain nodes.

In addition to node-wide security contexts, certain properties or relationships (e.g., edges) of the node may be associated with particular security contexts. For example, in a node representing a person, a name property may be publically exposed, but a social security number may require a subject to have certain security contexts to be exposed in a graph query. In another example, a given relationship between two nodes may require a particular security context to span from one node to the other despite a subject being able to access either node without the particular security context. To illustrate, consider a person node and a document node that are publically accessible by graph queries, but have a security context associated with the a "reviewer" relationship between the two nodes, which can prevent parties who are not "reviewers" from discovering what other "reviewers" have accessed.

One or more access control lists are maintained in the nodes specifying which security contexts allow access to the associated entity or property, and which security contexts deny access to the associated entity. For example, users may belong to one of several security groups based on their roles in an organization (e.g., "Human Resources", "Research Team Alpha", "Interns", "Contractors", "Terminated Employees") that specify various security contexts so that access to a given document may be granted to members of certain security groups (e.g., grant only to users belonging to a "Human Resources" group) or denied members of certain security groups (e.g., deny access to users belonging to "Interns" or "Terminated Employees"). Similarly, the machine identifier or access point location/characteristics for the subject are included in the graph query for determining whether machine or access point security contexts grant or deny spanning various nodes.

Each security context is associated with a node in the relational graph, referred to herein as a security node. For example, a group security context of "Information Technology Professionals" may have a first security node, a machine security context of "devices running Operating system X" may have a second security node, and an access point security context of "in the office" may have a third security context. Because the security identifiers for each context (e.g., the names or descriptions of the policies) may have a different length (as evidenced in the above examples), the security identifiers are converted into a numeric representation for use within the relational graph.

For each access-controlled node, the numeric representations of the security nodes are included in a listed set of access key/value pairs in a permit list and a deny list, respectively listing the security contexts that permit and deny access to the associated entity of the node. Additionally, the numeric representations are included in one of two Approximate Membership Query (AMQ) filters for each access-controlled node: a permit AMQ filter, including the numeric security identifiers for security contexts that allow access to the associated node, and a deny AMQ filter, including the numeric security identifiers for security contexts that deny access to the associated node. In additional aspects, each security node includes the node identifiers of the nodes for the entities that use the associated security contexts in associated permit/deny AMQ filters and lists.

AMQ filters include Bloom filters, cuckoo filters, quotient filters, and other data structures that provide a probabilistic check for whether an element is a member of a set that provides no false negatives; for a given comparison, the AMQ filter returns results of "potentially in the set" or "not in the set". When a result of "not in the set" is returned, it is determined that the given node does not include a given security context or the security node is not related to the given node. When a result of "potentially in the set" is returned, the associated permit/deny list is examined to determine whether to further traverse the relational graph from the given node. False positive results for "potentially in the set" results lead to a query to the associated being run without positive return from the list. The incidence of false positives ("potentially in the set" when not in the set) may be adjusted by the graph server 120 by adjusting the size of the AMQ filter, where a larger AMQ filter (using more bits for a given number of security contexts whose membership is tracked) results in a lower incidence of false positive results. One of ordinary skill in the art will be able to select an appropriate size to use for the AMQ filters to balance storage space needs for the AMQ filters and the computational resources expended on rerunning unnecessary queries due to false positives. In various aspects, the size selected for the AMQ filter is chosen based on a number of security contexts (security nodes) in the access control system 140 and a desired false positive rate, and the AMQ filter may remain static or be dynamic in size as security contexts are added to or removed from the membership set. In some aspects, the size of the AMQ filter is constant, which provides administrators with predictable storage needs for the nodes in the graph database 130.

The AMQ filter provides an array of bits, in which hashes of its member set are stored. Various hashing algorithms may be used to record a node's membership in an AMQ filter. A hashing algorithm (also referred to as a "hash function") yields a one-way encryption of data (referred to as a hash), which may be achieved according to various algorithms known to those of ordinary skill in the art (SHA-2, SHA256, MD5, BLAKE2, Keccak, GOST, etc.). In various aspects, the AMQ filters are Bloom filters, cuckoo filters, quotient filters, or another probabilistic filter, which provides the graph server 120 a structure to test whether a given security context is in place for a particular node to determine whether to span that node for a subject.

The AMQ filter hashes the identifier of the node that is a member of its set by one or more hash functions (or initializations of the same hash function) to determine a position in the array (e.g., the bits at $position_a$ for $hash_1$, $position_b$ for $hash_2$, and $position_c$ for $hash_3$). The bit at the designated position in the array is then set to one/TRUE to record the node as a member of the set monitored by the AMQ filter. The array of the AMQ filter is initially set so that all of its bits are set to zero/FALSE, and as elements are added to the member set, the bits designated by the hash functions are set to one/TRUE. If a hash function designates a position in the array for which the bit is already set to one/TRUE, that bit will remain set to one/TRUE, which provides 100% recall for the AMQ filter.

When reading from the AMQ filter to determine whether a node is part of the member set recorded in the array, the identifier of the candidate node is hashed as though it were being added to the array, and the positions generated for the candidate node (i.e., candidate positions) are bitwise-logically examined against the array. If all of the positions generated for the candidate node have values in the array of one/TRUE, the AMQ filter returns a positive result (e.g., "potentially in the set"). If one or more of the positions generated from the candidate node have values in the array of zero/FALSE, the AMQ filter returns a negative result (e.g., "definitely not in the set"). As will be appreciated, the meaning assigned to the values of the bits may be reversed in another aspect (e.g., initialization with zero/TRUE and indicating membership with one/FALSE, etc.) without departing from the spirit of the present disclosure; the AMQ filter is operable to track membership via a second state from a baseline first state according to various conventions.

For example, consider the member set of $SecurityContext_A$, $SecurityContext_B$, and $SecurityContext_C$, which are the numeric representations of the security contexts for denying access to a given node's associated entity. These security contexts are added to the deny list for the given node, and are recorded into a deny AMQ filter using three hash functions and an ordered array of thirty-two bits (positions). The identifier for each of the nodes is hashed according to each of the hash functions, yielding nine positions in the array (although not all nine positions may be unique). For example, $SecurityContext_A$ may be mapped to positions 1, 7, and 26; $SecurityContext_B$ to positions 5, 30, and 31; and $SecurityContext_C$ to positions 5, 12, and 26; yielding nine positions (seven unique) in the array. The bits in the array at each of the positions (1, 5, 7, 12, 26, 30, and 31) are set to one/TRUE (the second state) and at all other positions the bits remain set to zero/FALSE (the first state).

When the access control system 140 checks whether $SecurityContext_D$ is a member of the deny AMQ filter, $SecurityContext_D$ is hashed according to each of the hash functions, yielding three candidate positions in the array—at positions 1, 5, and 23 in the present example. The values of the bits in the array at positions 1, 5, and 23 are one/TRUE, one/TRUE, and zero/FALSE respectively, and because at least one position's value is zero/FALSE (the first state), the deny AMQ filter will return a negative response indicating that $SecurityContext_D$ is not part of the member set. Since the queried security context is not part of the deny list encoded into the example deny AMQ filter, the subject will not be denied access based on being associated with $SecurityContext_D$, although other security contexts may deny access or the subject may lack security contexts required by a permit AMQ filter.

Continuing the example from above, when a user checks whether $SecurityContext_E$ is a member of the permit AMQ filter, $SecurityContext_E$ is hashed according to each of the hash functions, yielding three candidate positions in the array—at positions 7, 12, and 30 in the present example. The values of the bits in the array at positions 7, 12, and 30 are all one/TRUE (the second state), and the permit AMQ filter will return a positive response (albeit a false positive) indicating that $SecurityContext_E$ is potentially a member of the set. The permit list will then be queried to determine whether $SecurityContext_E$ is actually a member of the required security contexts to permit access to the entity associated with the node.

When querying the AMQ filters (via a filter query) and the associated lists, one of the permit and the deny sets of security contexts is prioritized. The prioritized set of security contexts has its associated AMQ filter and list examined first, and if possitive results are returned, the other AMQ filter and list are not examined. If, instead, the priotitized AMQ filter and list return negative results, the other AMQ filter and list are then examined to determine whether the graph query can span the given node. To illustrate, consider a deny set given priority over a permit set where a filter query to the deny AMQ filter returns "potentially in the set"

and the deny list is examined to determine that the queried security context is indeed on the deny list, it is determined to deny permission to span the node without querying the permit AMQ filter or list.

The order in which the security contexts for the subject are arranged is adjusted to further improve the computational efficiency of access controlled graph query spanning. For example, the numeric representations of the security contexts are numerically sorted in some aspects (e.g., from smallest to largest), while in other aspects, a hit frequency of security contexts in graph queries or assignment frequencies of security contexts may be used to set an order in which to evaluated whether a subject is permitted to span a given node in a graph query.

As being associated with one security context that is a member of the deny list will deny the subject access to the node as effectively as being associated with multiple security contexts that are members of the deny list, the more frequently denied security contexts will be queried against the deny AMQ filter and list earlier than the less frequently denied security contexts. Similarly, as being associated with one security context that is a member of the permit list will permit the subject access to the node as effectively as being associated with multiple security contexts that are members of the permit list, the more frequently permitted security contexts will be queried against the permit AMQ filter and list earlier than the less frequently permitted security contexts.

The more frequently denied/permitted security contexts are observed and identified over time by the access control system 140 so that queries to the AMQ filters and lists will be made for the more frequently used security contexts before the less frequently used security contexts. For example, the list of security settings for the subject (and in some aspects the permit/deny lists for various nodes) are sorted by the frequency at which the given security contexts result in hits (i.e., positive results) between the subjects' security contexts and the security contexts noted in the AMQ filters and lists.

To illustrate, consider the two personal security contexts of group membership in the "Interns" group, which blocks access to several nodes in the relational graph, and the "Terminated Employees" group, which blocks access to all nodes in the relational graph. Although the "Terminated Employees" group is associated with access control to more nodes than the "Interns" group, the access control system 140 is more likely to observe graph queries from subjects noted as being interns than from subjects noted as being terminated employees. Over time, the access control system 140 therefore would prioritize checking whether a subject is associated with being an intern in the AMQ filters and lists over checking whether the subject is associated with being a terminated employee. The access control system 140 may periodically reevaluate the relative frequencies of security contexts and update the order in which those security contexts are evaluated (e.g., after every n days, graph queries, graph database updates).

As will be appreciated, maintaining and querying an AMQ filter requires storage and processing resources. In various aspects, a number of security contexts affecting a node may be used as a threshold to determine whether to create and maintain one or more AMQ filters for the security contexts of the node in addition to the permit/deny lists. For example, a node with n denying security contexts and n+1 permitting security contexts may include a deny list, a permit list, and a permit AMQ filter when the threshold is set to require n+1 security contexts for creating and maintain an AMQ filter. The graph query, when it spans the example node, will access a schema for the node to determine whether one or more AMQ filters are provided and should therefore be queried prior to querying the lists to determine whether a graph query from a given subject may span the node.

Figure 2:
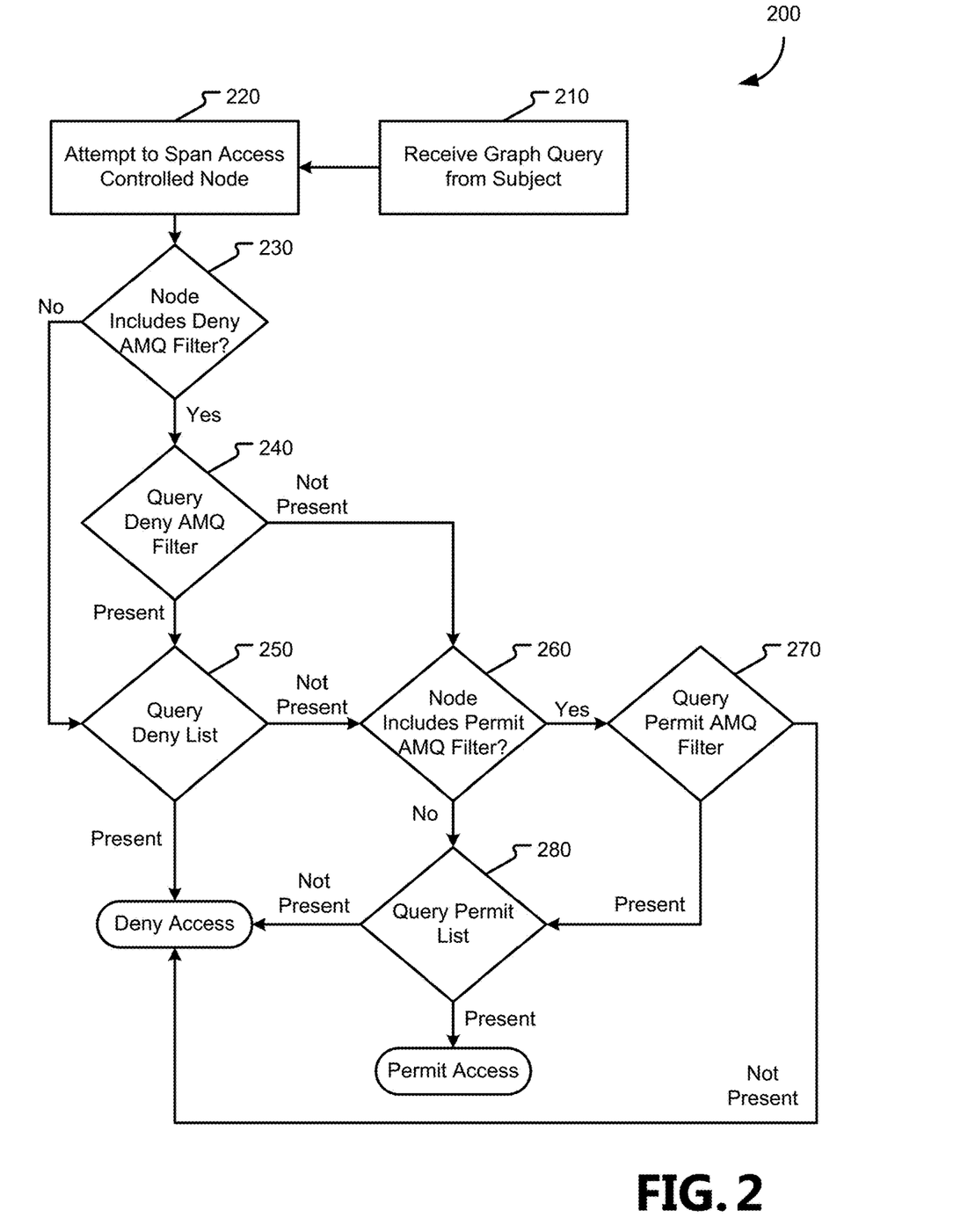
FIG. 2 is a flow chart showing general stages involved in an example method for controlling access to nodes in a graph query.

FIG. 2 is a flow chart showing general stages involved in an example method 200 for controlling access to nodes in a graph query. Method 200 begins with OPERATION 210, where a graph query is received from a subject. In various aspects, security context data of various types are included in the graph query. For example, one or more of a device identifier, a software version identifier, a remote desktop indicator, or the like are included as security context data to compare against machine security contexts. In another example, one or more of an IP (Internet Protocol) address from which the graph query request was received, network configuration information, geographic location, or the link are included as security context data to compare against access point security contexts. In a further example, a username for the subject or one or more user group to which the subject belongs are included as security context data to compare against machine security contexts or for the access control system 140 to lookup additional security context data for the subject. For example, a user name may be used to lookup the groups to which a user belongs in a directory server.

Proceeding to OPERATION 220, the graph query attempts to span an access controlled node in the relational graph. OPERATION 220 invokes DECISIONS 230-280 each time the graph query attempts to span an access controlled node to determine whether to permit or deny access to the node.

Attempting to access an access controlled node at OPERATION 220 includes attempts to access the initial node (also referred to as an anchor) for the graph query. Because an anchor acts as the starting point for a graph query to span from, when a subject is denied access to an initial node, a new anchor must be chosen before the graph query can span outward. In various aspects, an index structure for the relational graph is queried to determine the potential anchors that the graph query may initiate from for the subject.

Method 200 will continue attempting to access nodes according to the graph query until the graph query has collected sufficient results to provide to the subject or there are no further nodes that the subject may access based on current security contexts. Access controlled nodes may differentiate themselves from non-access controlled nodes (i.e., nodes with no security context restrictions) via a schema that identifies whether a given node includes one or more of: a deny AMQ filter, a deny list, a permit AMQ filter, and a permit list. Each time that the graph query encounters an access controlled node, OPERATION 220 will trigger, and proceed to DECISION 230 to begin determining whether to span the given node.

At DECISION 230 it is determined whether the node attempting to be accessed at OPERATION 220 includes a deny AMQ filter. In response to determining that the node includes a deny AMQ filter, method 200 proceeds to DECISION 240. Otherwise, in response to determining that the node does not include a deny AMQ filter, method 200 proceeds to DECISION 250.

In some aspects, a given node may not have a set of security contexts that deny access that is sufficiently large to justify maintaining a deny AMQ filter, and the denying security contexts are therefore stored only in a deny list for the given node. In other aspects, where a given node does not include any denying security contexts, but does include permitting security contexts, an empty deny list may be maintained by the given node, a null/empty deny AMQ (holding all zero/FALSE) may be maintained to ensure a quick lookup that proceeds to DECISION 260, or the schema for the given node may indicate that DECISIONS 230-250 are to be skipped and the determination of whether access is to be granted is to be started at DECISION 260.

When the node includes a deny AMQ filter, a filter query is posed to the deny AMQ filter at DECISION 240 to determine whether at least one of the security contexts associated with the subject are present in the deny AMQ filter. As described with reference to FIG. 1, the AMQ filters produce no false negatives in response to filter queries, but may produce false positives. Therefore, when a negative response is received to the filter query, indicating that none of the subject's security contexts are members of the set of denying security features, method 200 will proceed to DECISION 260. Conversely, when a positive result is received from the filter query, indicating that at least one of the subject's security contexts is a member of the set of denying security features, method 200 proceeds to DECISION 250, as the indication may be a true positive or a false positive.

At DECISION 250 the deny list is queried to determine whether the denying security context that was indicated as a (potential) member of the deny AMQ filter at DECISION 240 is a member of the deny list. In various aspects, all of the subject's security contexts are queried against the deny list, while in other aspects only those of the subject's security contexts that returned a positive result to the filter query in DECISION 240 are queried against the deny list. In some aspects, DECISION 240 proceeds to DECISION 250 after querying all of the subject's security contexts against the deny AMQ filter, but in other aspects after a first positive result to the filter query, method 200 proceeds to DECISION 250, but may return to DECISION 240 if it is determined that the filter query returned a false positive.

When it is determined that the deny list includes a denying security context that is also associated with the subject (a true positive from DECISION 240), access to the access controlled node will be denied, and the graph query will continue attempting to span the relational graph without accessing the access controlled node. When it is determined that the deny list does not include a denying security context that is also associated with the subject (a false positive from DECISION 240), method 200 proceeds to DECISION 260.

Proceeding to DECISION 260, it is determined whether the access controlled node includes a permit AMQ filter. Similar to the decision of whether to maintain a deny AMQ filter, a given access controlled node may not maintain a permit AMQ filter in aspects where a number of security contexts that grant access to the associated entity do not satisfy a threshold amount. The presence or absence of a permit AMQ filter is indicated in a schema for the access controlled node. When it is determined that the access controlled node includes a permit AMQ filter, method 200 proceeds to DECISION 270. Otherwise, method 200 proceeds to DECISION 280.

In aspects in which the access controlled node does not require any permitting security contexts (i.e., only being access controlled by denying security contexts), a null or empty permit AMQ filter may be maintained. In others aspects not requiring permitting security contexts, an element in the schema may indicate that after proceeding from DECISION 240 or DECISION 250 in response to determining that the subject's security contexts are not present in a deny AMQ filter or deny list, that the graph query is to be permitted access without executing DECISIONS 260-280.

At DECISION 270 a filter query is posed to the permit AMQ filter to determine whether at least one of the security contexts associated with the subject are present in the permit AMQ filter. As described with reference to FIG. 1, the AMQ filters produce no false negatives in response to filter queries, but may produce false positives. Therefore, when a negative response is received to the filter query, indicating that none of the subject's security contexts are members of the set of permitting security features, method 200 will deny access to the access controlled node. Conversely, when a positive result is received from the filter query, indicating that at least one of the subject's security contexts is a member of the set of permitting security features, method 200 proceeds to DECISION 280, as the indication may be a true positive or a false positive Proceeding to DECISION 280, the permit list is queried to determine whether the granting security context that was indicated as a (potential) member of the permit AMQ filter at DECISION 270 is a member of the permit list. In various aspects, all of the subject's security contexts are queried against the permit list, while in other aspects only those of the subject's security contexts that returned a positive result to the filter query in DECISION 270 are queried against the permit list. In some aspects, DECISION 270 proceeds to DECISION 280 after querying all of the subject's security contexts against the permit AMQ filter, but in other aspects after a first positive result to the filter query, method 200 proceeds to DECISION 280, but may return to DECISION 270 if it is determined that the filter query returned a false positive.

When it is determined that the permit list includes a granting security context that is also associated with the subject (a true positive from DECISION 270), access to the access controlled node will be granted, and the graph query will access the access controlled node and continue spanning the relational graph. When it is determined that the permit list does not include a granting security context that is also associated with the subject (a false positive from DECISION 270), access to the access controlled node will be denied, and the graph query will continue attempting to span the relational graph without accessing the access controlled node.

Figure 3:
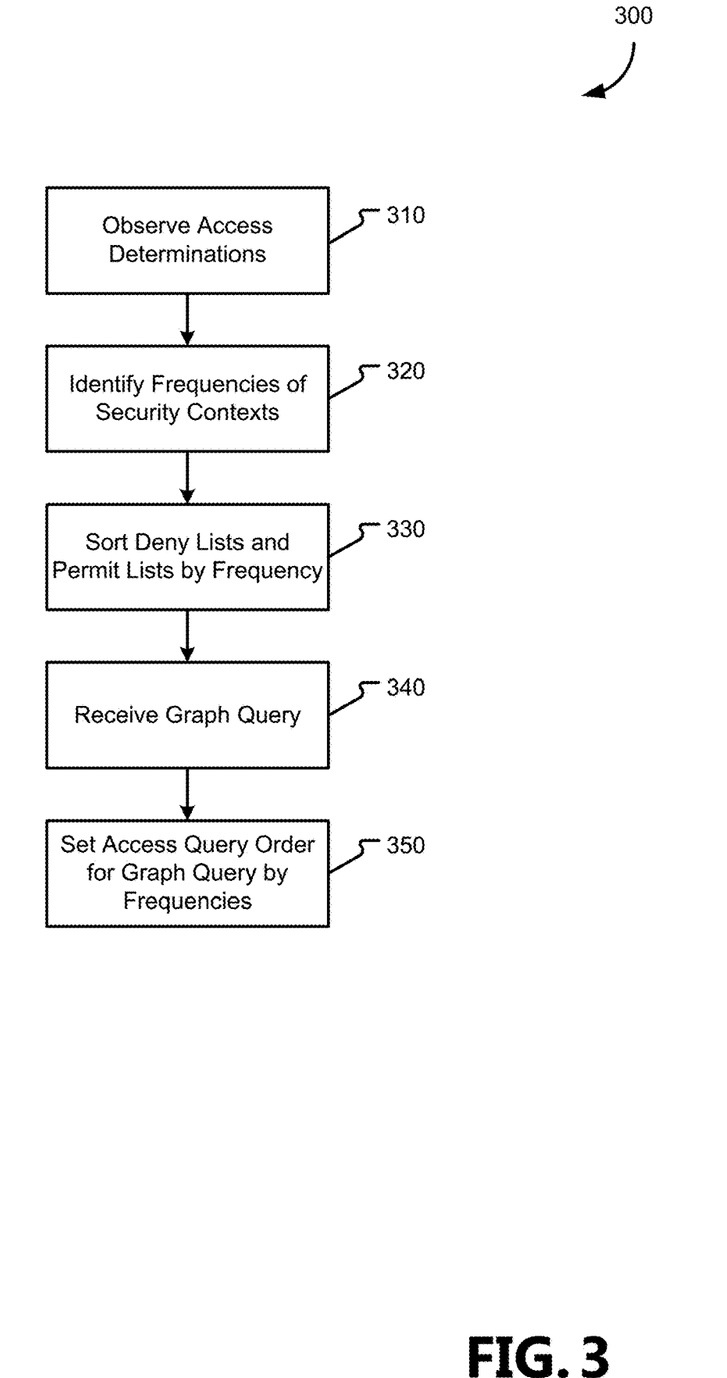
FIG. 3 is a flow chart showing general stages involved in an example method for prioritizing which security contexts to check earliest in a query time determination of whether to grant access to an access controlled node in response to a graph query.

FIG. 3 is a flow chart showing general stages involved in an example method 300 for prioritizing which security contexts to check earliest in a query time determination of whether to grant access to an access controlled node in response to a graph query. Method 300 begins with OPERATION 310 by observing the access determinations for whether to grant or deny access to access controlled nodes and the security contexts that result in granting or denying access. For example, a graph query may attempt to span an access controlled node and provide SecurityContext$_A$, SecurityContext$_B$, and SecurityContext$_C$. If SecurityContext$_A$ and SecurityContext$_B$ are not seen in the deny list or access list, but SecurityContext$_C$ is found to be a member of one of the lists, SecurityContext$_C$ will be observed as denying or granting access whereas SecurityContext$_A$, SecurityContext$_B$ are not observed according to OPERATION 310.

Proceeding to OPERATION 320, the frequencies at which individual security contexts are observed being used to grant or deny access are identified. In various aspects, the frequencies at which a given security context is used to deny access, grant access, and grant or deny access are tracked in three separate frequencies. These frequencies are identified, in some aspects, via a count-min sketch or a counting Bloom filter serving as a frequency table in which the granting or denial of access according to various security contexts is recorded. The frequencies may be identified on a periodic basis (e.g., every n days, graph queries, denials/grants of access) or in response to a user command.

At OPERATION 330 the permit lists and the deny lists are sorted according to the corresponding identified granting and denying frequencies. More frequently observed security contexts are placed ahead of less frequently observed security contexts in the sorted order so that when the lists are queried for their memberships, a hit is more likely to be returned sooner. In various aspects, the lists are sorted in response to determining the frequencies at OPERATION 320, on a different periodic basis (e.g., every m or n+m days, graph queries, denials/grants of access), or in response to a user command. Additionally, a given access controlled node may resort its lists in response to being queried for or updated regarding its security contexts.

At OPERATION 340 a graph query is received from a subject to return results from a relational graph. The graph query includes one or more security contexts for the subject or data used to obtain one or more security contexts for the subject. When a plurality of security contexts are available for the subject, such as, for example, belonging to multiple user groups, providing machine security contexts or access point security contexts in addition to personal security contexts, etc., those security contexts are sorted at OPERATION 350 to set a query order by which the subject's security contexts are tested against the AMQ filters and lists of the access controlled nodes. The security contexts may be ordered according to the denying frequencies, the granting frequencies, or the denying or granting frequencies identified in OPERATION 320 depending on the setting of the relational graph. By setting the order in which the subject's security contexts are tested against the AMQ filters and lists to use the most frequently observed granting/denying security contexts first, the queries to the AMQ filters and lists are expected to return a hit (if one is possible) with fewer computing resources being used to make comparisons.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
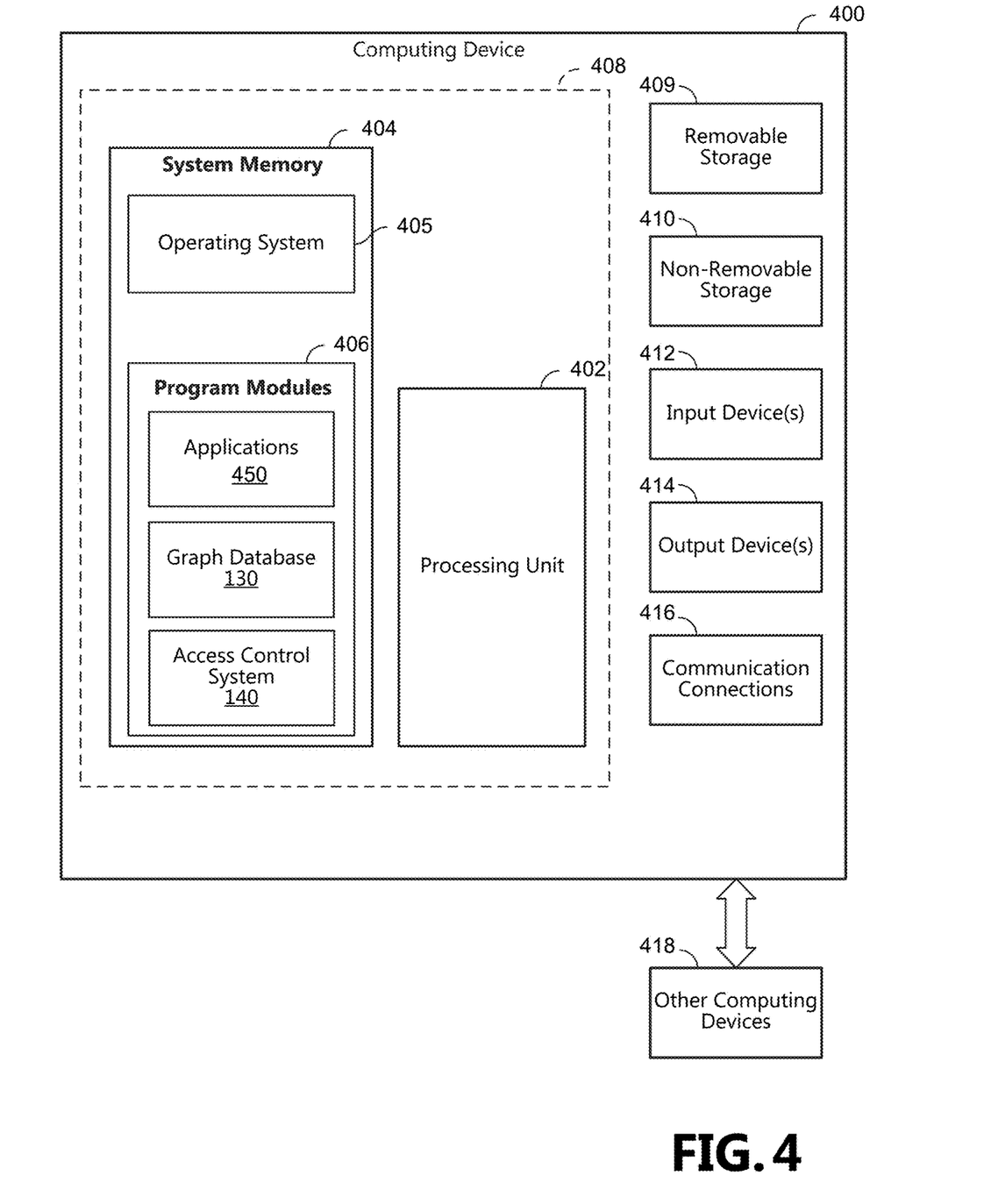
FIG. 4 is a block diagram illustrating example physical components of a computing device.
Figure 5:
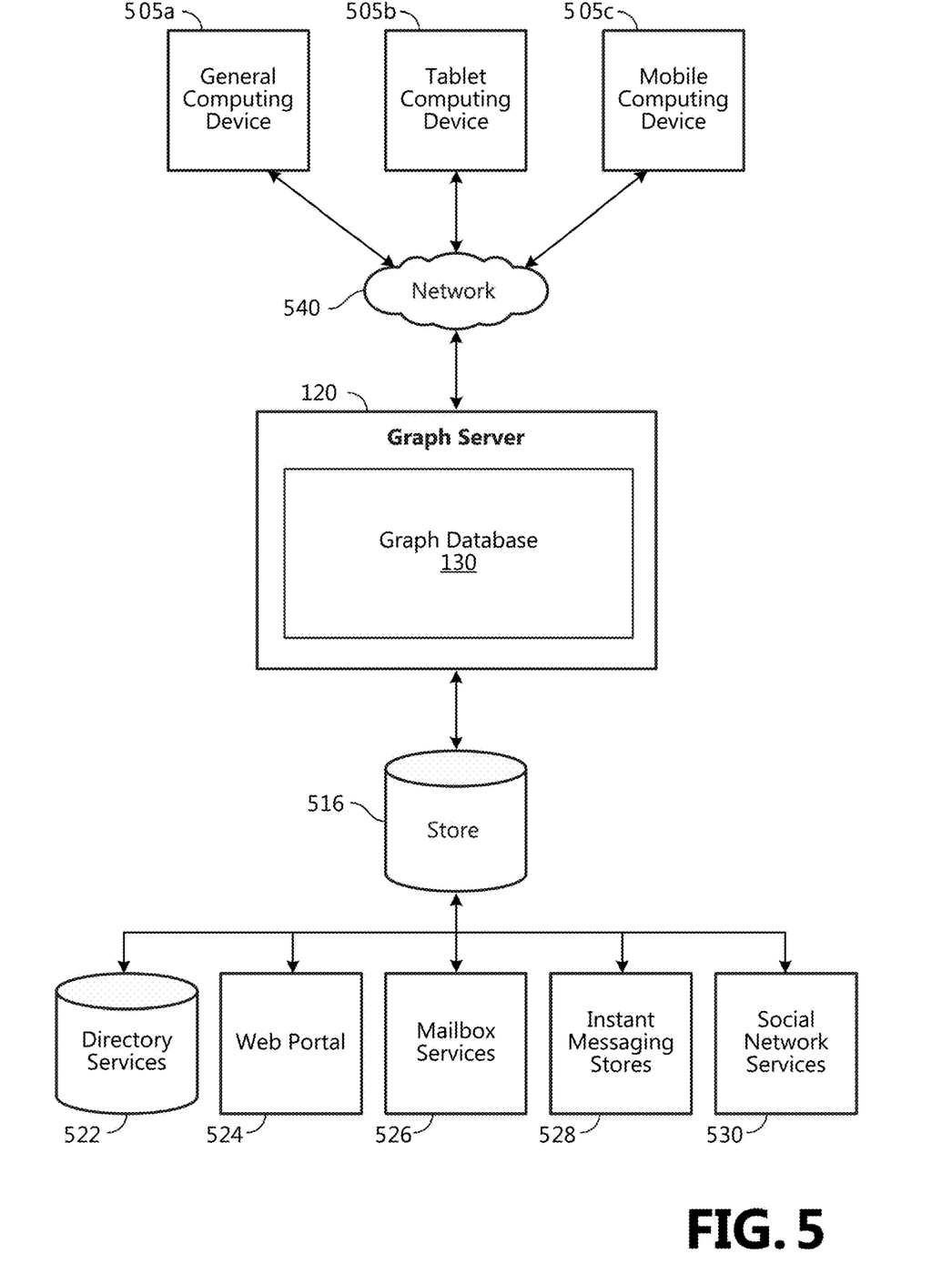
FIG. 5 is a block diagram of a distributed computing system.

FIGS. 4-5 and the associated descriptions provide a discussion of a variety of operating environments in which examples are practiced. However, the devices and systems illustrated and discussed with respect to FIGS. 4-5 are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the graph database 130 and access control system 140. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., access control system 140) perform processes including, but not limited to, one or more of the stages of the methods 200 and 300 illustrated in FIGS. 2 and 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIG. 5 illustrates one example of the architecture of a system controlling access to nodes in a relational graph at query time as described above. Content developed, interacted with, or edited in association with the graph database 130 is enabled to be stored in different communication channels or other storage types. For example, various documents may be stored using a directory service 522, a web portal 524, a mailbox service 526, an instant messaging store 528, or a social networking site 530. The graph database 130 is operative to use any of these types of systems or the like for controlling access to nodes in a relational graph at query time, as described herein. According to an aspect, a server 520 provides the graph database 130 to clients 505a,b,c. As one example, the server 520 is a web server providing the graph database 130 over the web. The server 520 provides the graph database 130 over the web to clients 505 through a network 540. By way of example, the client computing device is implemented and embodied in a personal computer 505a, a tablet computing device 505b or a mobile computing device 505c (e.g., a smart phone), or other computing device. Any of these examples of the client computing device are operable to obtain content from the store 516.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for controlling access to one or more nodes in a relational graph, comprising:
  receiving a graph query including a subject security context;
  determining whether a node in the relational graph denies access to the node, the determining including determining at least one of (a) whether a deny Approximate Membership Query (AMQ) filter denies access to the node, or (b) whether a query deny list denies access to the node; and
  denying access to the node if it is determined that the node denies the access.

2. The method of claim 1, further comprising permitting access to the node if it is determined that the node does not deny the access.

3. The method of claim 1, further comprising:
  determining whether the node in the relational graph permits access to the node, the determining including determining at least one of (a) whether a permit Approximate Membership Query (AMQ) filter permits access to the node, or (b) whether a query permit list permits access to the node; and
  permitting access to the node if it is determined that node permits the access.

4. The method of claim 3, further comprising denying access to the node if it is determined that the node does not permit the access.

5. The method of claim 3, whether determining whether the permit Approximate Membership Query (AMQ) filter permits access to the node includes querying the permit AMQ filter with the subject security context, the permit AMQ filter including security contexts that grant access to the node as permitting members.

6. The method of claim 3, wherein determining whether the query permit list permits access to the node includes querying the permit list with the subject security context, the permit list including security contexts that grant access to the node.

7. The method of claim 1, wherein determining whether the deny Approximate Membership Query (AMQ) filter denies access to the node includes querying the deny Approximate Membership Query (AMQ) filter with the subject security context, the deny AMQ filter including security contexts that deny access to the node as denying members.

8. The method of claim 1, wherein determining whether the query deny list denies access to the node includes querying the deny list with the subject security context, the deny list including security contexts that deny access to the node.

9. A method for controlling access to nodes in a relational graph, comprising:
   identifying frequencies at which security contexts are used to grant or deny access to the nodes in the relational graph;
   sorting permit lists and deny lists based on the identified frequencies;
   receiving a graph query on the relational graph;
   obtaining one or more security contexts for a subject; and
   ordering the security contexts for the subject, based on the identified frequencies.

10. The method of claim 9, wherein the frequencies are identified via one of a count-min sketch or a counting Bloom filter.

11. The method of claim 9, wherein the frequencies are identified on a periodic basis or in response to a user command.

12. The method of claim 9, wherein in the sorting, more frequently observed security contexts are placed ahead of less frequently observed security contexts.

13. The method of claim 9, wherein the graph query includes at least one security context for the subject, and the obtaining is based on the at least one security context for the subject.

14. The method of claim 9, wherein the ordering sets a query order by which security contexts are tested against at least one of an Approximate Membership Query (AMQ) filter or a list.

15. A system for controlling access to one or more nodes in a relational graph, comprising:
   a memory storing a program; and
   a computer processor operating under control of the program to:
      receive a graph query including a subject security context,
      determine whether a node in the relational graph denies access to the node, by determining at least one of (a) whether a deny Approximate Membership Query (AMQ) filter denies access to the node, or (b) whether a query deny list denies access to the node, and
      deny access to the node if it is determined that the node denies the access.

16. The system of claim 15, further comprising:
   a user interface coupled to the computer processor, the user interface providing user-input commands to the computer processor for controlling the computer processor.

17. The system of claim 15, wherein the computer processor also is controllable by the program to permit access to the node if it is determined that the node does not deny the access.

18. The system of claim 15, wherein the computer processor also is controllable by the program to determine whether the node in the relational graph permits access to the node, by determining at least one of (a) whether a permit Approximate Membership Query (AMQ) filter permits access to the node, or (b) whether a query permit list permits access to the node.

19. The system of claim 18, wherein the computer processor also operates under control of the program to deny access to the node if it is determined that the node does not permit the access.

20. The system of claim 15, wherein, in determining whether the deny Approximate Membership Query (AMQ) filter denies access to the node, the computer processor operates under control of the program to query the deny Approximate Membership Query (AMQ) filter with the subject security context, the deny AMQ filter including security contexts that deny access to the node as denying members.

* * * * *